March 21, 1967     E. D. TRUEBLOOD     3,309,739
PLASTIC INJECTION MACHINE
Filed April 20, 1964     2 Sheets-Sheet 1
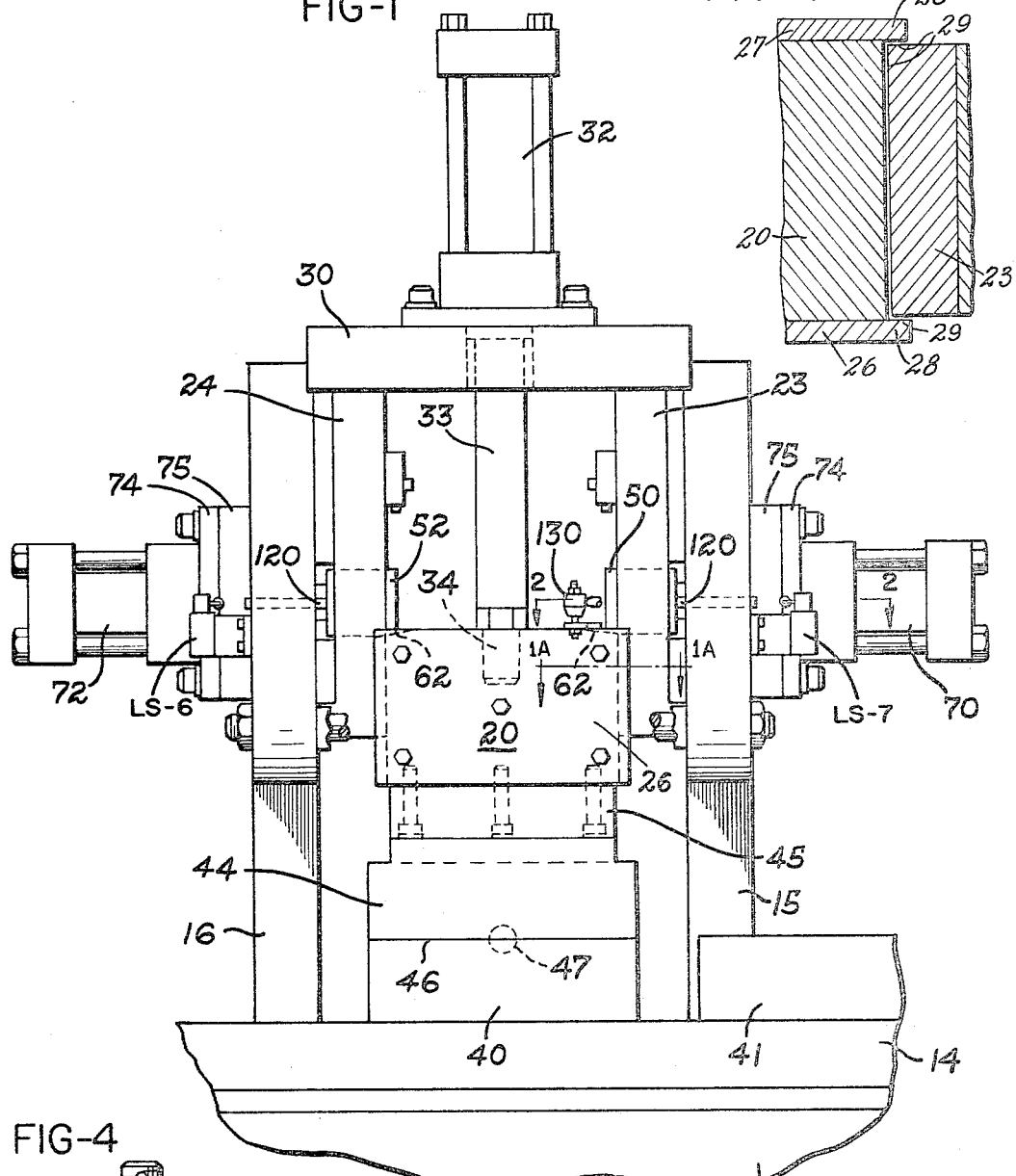
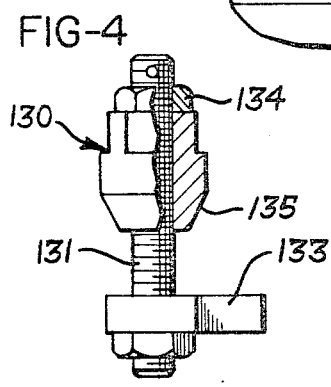
INVENTOR.
ELMER D. TRUEBLOOD
BY
Marechal, Biebel, French & Bugg
ATTORNEYS March 21, 1967  E. D. TRUEBLOOD  3,309,739
PLASTIC INJECTION MACHINE
Filed April 20, 1964  2 Sheets-Sheet 2
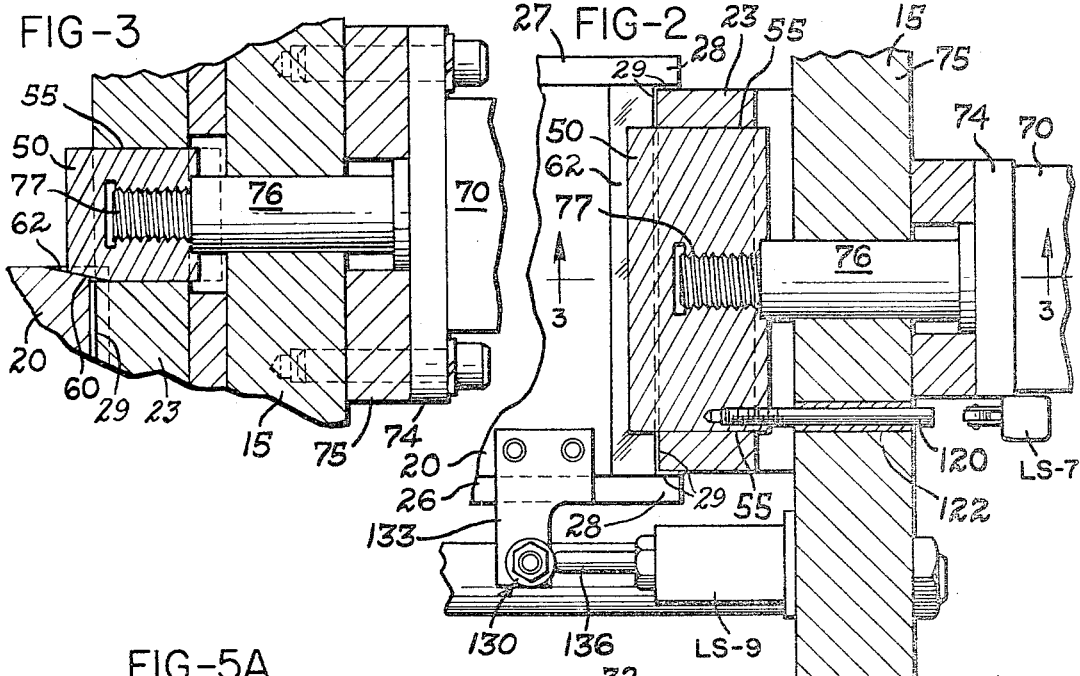
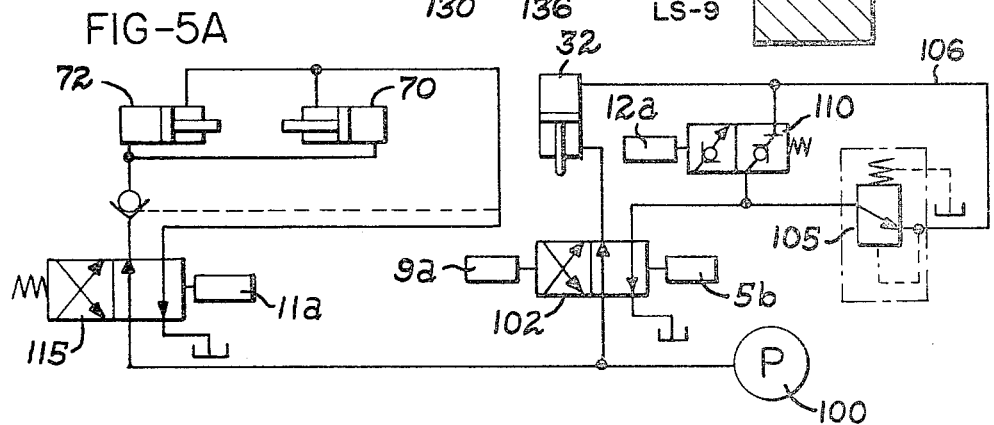
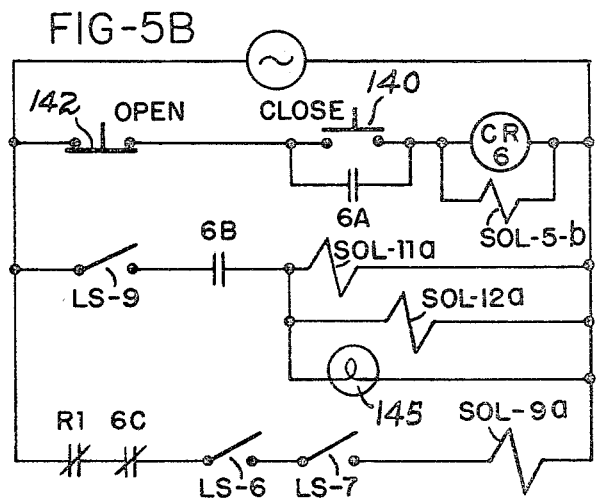
INVENTOR.
ELMER D. TRUEBLOOD
BY
Marechal, Biebel, French & Bugg
ATTORNEYS

3,309,739
PLASTIC INJECTION MACHINE
Elmer D. Trueblood, Dayton, Ohio, assignor to Trueblood, Inc., doing business as Union Tool & Engineering Co., Dayton, Ohio, a corporation of Ohio
Filed Apr. 20, 1964, Ser. No. 361,125
4 Claims. (Cl. 18—30)

This invention relates to a plastic injection machine and more particularly to a high pressure injection molding machine and the clamping apparatus for closing a pair of mating mold parts for the injection of plastic material into a cavity formed therebetween.

It is frequent practice in injection molding of small parts to employ a first mold part and a plurality of cooperating or mating mold parts for increasing the rate of production. In a vertical closing machine for instance, a single upper mold may be used with a plurality of mating bottom molds mounted, on a shuttle table or on a rotary indexing table. In such machines the upper mold part and one of the bottom mold parts are closed under force and the mold cavity or cavities therein injected with plastic under pressure while one or more of the other bottom mold parts are accessible for cooling, stripping, and loading by inserting into the mold cavity any special parts for the finished article.

In such plastic injection machines, an upper mold shoe is mounted on a suitable bolster head and carries a first mold insert which forms a portion of the cavity. This mold shoe and its associated insert is used, in succession, with one or more bottom mold shoes each of which also supports and contains a mating mold insert for forming the complete article. Often, the article may include one or more prefabricated or preformed inserts around which the plastic will be shot. An example is a machine for making electric cord sets which injection-form the electrical plug-in connectors on the ends of wires to which the electrical prongs have previously been attached. The mechanical parts of the finished article will preferably be inserted into one of the bottom mold shoes and then moved, such as by a shuttle table or otherwise, into a position in alignment with the upper mold shoe.

It is important that the aligned mold parts be brought to a complete closure prior to each injection, and that the parts be held in the closed position with sufficient force during injection to prevent leakage or extrusion along the parting surface which would otherwise result in waste, damaged parts, or undesired flashings. Mold closing mechanisms which have heretofore been employed, have required careful adjustment of the closing mechanism to achieve the desired closing force and parallel condition of the parts. Also, the bottom mold parts must be accurately aligned with respect to each other, and with respect to the upper mold part, to assure proper closing.

Where more than one bottom mold part is used it has been necessary to form the mold parts to as nearly the same height and condition of parallelism as practicable. When a tool maker missed the desired height or parallelism within a few thousandths on the bench, it was usually necessary to shim either the bottom or top mold parts in order to achieve effective closing of the mold parts, or adjust the closing linkage, or both. Not only are such adjustments in the closing mechanism and in the alignment of the molds tedious and difficult to make, but they also increased the time required to set up a plastic injection machine to a given job, and increased the probability that the machine may get out of alignment with use.

It is therefore the primary object of this invention to provide an injection molding machine having mold closing apparatus which is self-adjusting in the direction of mold closing movement.

Another important object of this invention is the provision of a plastic injection machine having a mold closing mechanism which is self-adjusting and self-aligning in a plane transverse to the direction of closing movement to compensate for variations in parallelism between the mold portions.

A further object of this invention is the provision in a plastic injection machine of an improved parallel clamp which is free of mechanical linkage adjustments.

A still further object of this invention is the provision of a plastic injection machine which is easy to set up, has a minimum of adjustments, and eliminates the necessity for the use of shims in leveling the mold parts.

A still further object of this invention is the provision, in a plastic injection machine, of a mold closing clamp mechanism which automatically aligns to close the mold parts which may be a few thousandths off in height, in parallelism, or both.

Another object of this invention is the provision of a plastic injection machine of a mold closing mechanism which is self-adjusting and self-compensating for wear.

A still further object of this invention is the provision of a plastic injection machine as outlined above further having a control which effects initial closing of the mold parts under relatively low force assuring the proper alignment of mold inserts, and which concludes the closing movement under substantially higher force.

These and other objects and advantages of the invention will be apparent from the following description, the accompanying drawings and the appended claims.

In the drawings:

FIG. 1 is a front elevation with parts being broken away of a plastic injection machine constructed according to the teachings of this invention;

FIG. 1A is an enlarged fragmentary horizontal section taken generally along the line 1A—1A of FIG. 1;

FIG. 2 is an enlarged fragmentary horizontal section taken generally along the line 2—2 of FIG. 1;

FIG. 3 is a fragmentary vertical section taken generally along the line 3—3 of FIG. 2;

FIG. 4 is an enlarged fragmentary view of a limit switch operator; and

FIGS. 5A and 5B are, respectively, hydraulic and electric control diagrams of this invention.

Referring to the figures of the drawings which illustrate a preferred embodiment of the invention, a vertical-closing plastic injection machine is shown in FIG. 1 as having a base 12 on which a shuttle table 14 is mounted for reciprocal movement. The base 12 also supports a pair of upright, overhanging spaced frame members including a right hand frame member 15 and a left hand frame member 16. A suitable injection molding machine of this general type is shown and described in the United States patent to Trueblood No. 3,091,809, issued June 4, 1963.

The right and left vertical frame members 15 and 16 are formed with overhanging front portions which support therebetween for vertical reciprocal movement a clamping head bolster block 20. The bolster block 20 is guided on the frame for reciprocal movement between a right hand guideway or side rail 23 and a similar left hand side rail 24. The rails 23 and 24 are preferably formed of hardened tool steel and may be rectangular in section, as shown by the right hand rail 23 in FIG. 2. The bolster block 20 is guided by means forming a front guide plate 26 and a rear guide plate 27 fixed respective to front and back surfaces of the block 20. Each plate 26 and 27 has a width in excess of the width of the block 20, and thereby define overhanging ends 28, as shown in FIG. 2, which engage the rails 23 and 24 and guide the block 20 during reciprocal movement along front and rear surfaces of the side rails. The preferred arrangement is such that the block 20 is free to move between the rails 23 and 24 by a limited movement at 29 in FIGS. 1A, 2 and 3 in a plane transverse to the direction of opening and closing movement. This permits the block 20 to move by a limited amount for applying a uniform closing force to the mold parts.

Means for effecting the clamping movement of the bolster block 20 includes an upper transverse support 30 on which is mounted a clamping hydraulic cylinder 32. The cylinder 42 is double-ended and is formed with a downwardly depending rod 33 which is suitably attached at 34 into the block 20.

The plastic injection machine of this invention is particularly suited for ease of injecting plastic into cavities formed in cooperating upper and lower mold parts. Thus, the tooling for a machine of this type may include two or more lower mold parts 40 and 41 shown as being supported in spaced relation to each other on the table 14 in FIG. 1. A single cooperating and mating upper mold part 44 is carried on the bolster block by an adapter plate 45, and is movable with the block 20 between an open position raised above the part 40 and a closed injecting position in engagement with the part 40. The upper and lower mold parts are preferably constructed as shown in the above-identified Trueblood patent as being formed with a universal shoe within which a mold insert is carried. The mold parts 40 and 44 are shown in FIG. 1 as being held together in the closed or injection position and define therebetween a parting plane 46 which may bisect a nozzle inlet opening shown at 47 in outline form.

It is necessary that the mold parts 40 and 44 be clamped and held closed along the plane 46 with sufficient accuracy and force as to prevent leakage along the parting plane. While the maintenance of the conditions necessary to achieve this and to maintain it over a period of time may not be too difficult where a single set of molds is employed, it becomes considerably more difficult where more than one bottom mold is employed, such as in machines using rotary or shuttle tables with a plurality of cooperating mold parts, corresponding generally to the parts 40 and 41. Therefore, this invention includes clamping apparatus in combination with the bolster block 20 which is self-aligning in the direction of closing movement and in a plane transverse to this direction to assure the proper closing with each bottom mold part without special alignment procedures.

This apparatus includes a pair of opposed locking blocks or cams, comprising a right hand locking cam 50 and a left hand locking cam 52 each guided on the frame for independent transverse movement. The side rails 23 and 24 are each provided with means defining an accurately machined cam block access and guide opening 55 therein. The opening 55 is formed to correspond to the cross section form of the cam blocks 50 and 51, and in the preferred embodiment, the cams are rectangular in section and move through closely the fitting rectangular openings 55 formed in the side rails. As shown best in FIGS. 2 and 3, wherein the details of the right hand locking cam 50 are shown, it will be seen that the cam 50 has a width or depth which compares substantially to the width or depth of the block 20. The cam 52 is similarly formed. The side rails 23 and 24 thus comprise the means for guiding the clamping blocks in transverse movement between retracted positions clear of the block 20 and force applying positions in engagement with the block.

Each of the cams 50 and 52 is formed with a forward beveled or inclined cam edge as indicated generally at 50 in FIG. 3 along a bottom edge thereof. This cam edge is formed with a uniform planar slope, and cooperates with a suitably formed inclined cam slope 62 formed along one of the upper edges of the block 20. Preferably, identical cam slopes 60 and 62 are formed respectively in the cam blocks 52 and the adjacent cooperating edge of the block 20 opposite to that of the cam 50. For example, these slopes may be in the order of 10° from the horizontal or from a reference plane normal to the direction of closing movement. The overall height of the cooperating slopes is defined as sufficient to compensate for all normally anticipated variations in height between the mold parts, and may be in the order of one-eighth of an inch, for example. When the cam blocks are moved inwardly toward each other, and the block 20 is substantially in its closed position, the cam surfaces 60 thereon engage one of the surfaces 62 and apply a component of high closing force on the block 20.

Means for applying and retracting the clamping blocks include right and left hand locking cylinders 70 and 72 respectively for the blocks 50 and 52. The locking cylinders may be flanged as indicated at 74 and attached to one of the vertical frames 15 or 16 by a cylinder mounting plate 75, as shown in FIG. 3. An opening may be made through the vertical frame members to accommodate the piston rod 76 which has an inner threaded end 77 of reduced diameter received within a suitable tapped opening formed centrally of the associated clamping blocks 50 and 52. The locking cylinders 70 and 72 operate to move the associated clamping blocks 50 and 52 between retracted positions, as shown by the broken lines in FIG. 3, into clamping positions in which the cooperating cam surfaces 60 and 62 are mutually engaged under the force of the cylinders.

The total possible transverse movement of the clamping blocks 50 and 52 by their respective cylinders is in excess of that shown in the full lines in FIGS. 2 and 3. The total movement is thus sufficient to utilize the major portion of the cooperating cam surfaces 60 and 62. Also, during plastic injection, the full hydraulic force is held at both of the locking cylinders 70 and 72 so that the closing force between the mold parts is maintained at its maximum value.

The clamping blocks 50 and 52 move mechanically independently of each other. Each block moves by an amount sufficient to bring the upper and lower mold parts into full engagement across the parting plane 46 and hold the parts together with sufficient force to prevent leakage. If any variation exists between the height or parallelism of the lower mold parts, the clamping blocks 50 will move under the influence of its respective cylinder to bring the parts into full engagement across the parting plane and to maintain the desired closing force.

The locking cams 50 and 52 are normally held in a retracted position, as shown by the broken lines in FIG. 3. In this position, the cams are clear of the bolster block 20 permitting unrestricted opening and closing movement of this block and the attached upper mold part 44. Control means are provided for operating the locking cams 50 and 52 in accurately timed relation with respect to the position of the block 20.

The control means, as shown in FIGS. 5–A and 5–B, includes position responsive means which operates upon the block 20 moving to a predetermined closed position for applying fluid under high pressure to each of the cylinders 70 and 72. This control means also preferably applies fluid under high pressure to the clamping cylinder 32.

Preferably, the operation of the cams 50 and 52 is delayed until the mold parts 40 and 44 have been brought sufficiently close together by the clamping cylinder 32, under relatively low force, to assure that the molds and any inserts which may be placed therein are in proper alignment. For example, the control circuit may operate to apply high closing force only after the mold parts are within a few thousandths of an inch of being fully closed. This feature also protects an operator from serious injury in the event that he may inadvertently have a hand or finger between the mold parts 40 and 44. The initial closing force of the cylinder 32 is preferably regulated by the control circuit at a sufficiently small value to avoid serious injury either to an operator or to the mold cavities in the event that a foreign object lies within the cavity or that an insert has been improperly aligned.

Referring to FIG. 5–A, which shows a somewhat simplified hydraulic diagram of the invention, a hydraulic pump is shown at 100 which applied hydraulic fluid under pressure through a four-way valve 102 selectively to the opposite ends of the cylinder 32. This circuit further includes a pressure reducing regulator valve 105 which is normally in the circuit and which applies hydraulic fluid under relatively low regulated pressure through the line 106 to effect the initial closing movement of the cylinder 32 when the solenoid 5–b of the valve 102 is operated. A spring-loaded, self-closing diverter valve 110 is connected in shunt or parallel to the pressure regulator valve 105, and operates upon the energization of its solenoid 12a to bypass the regulator valve and to apply fluid under full pump pressure directly to the cylinder 32.

The cam operating or locking cylinders 70 and 72 are also operated from the same hydraulic source 100 by a spring loaded four-way selector valve 115. In the unenergized position of this valve, the cylinders 70 and 72 are held in their retracted position, and energization of the solenoid 11a operates to apply fluid under full pump pressure to each of these cylinders to effect the clamping movement of the attached locking cams 50 and 52.

The retracted position of each of the cams 50 and 52 is determined and signaled by a pair of limit switches LS–6 and LS–7, as shown in FIGS. 1 and 2. These limit switches each respond to the locking cams in their fully retracted position, and may be conveniently mounted respectively on the outer surface of the left- and right-hand frame members 16 and 15. As shown in FIG. 2, the block 50 may be threaded and tapped to receive the inner end of a switch operating pin 120. The pin 120 is suitably guided in a sleeve bushing 122 within the frame member 15 and is proportioned to contact the switch LS–7 and to close the switch upon the block attaining its fully retracted position. A similar operating pin 120 is also provided for the cam 52 and the associated limit switch LS–6.

Circuit means responsive to the bolster block 20 attain a predetermined closed position consists of a tapered switch actuator 130 (FIG. 4) which is adjustably carried in forwardly offset relation on the top of the block 20. The actuator 130 is adjustably threaded on a vertical pin 131 which, in turn, is supported on a plate 133 extending forwardly of the top of the block 20. The adjusted position of the actuator 130 is retained by a lock nut 134. The lower surface of the actuator 130 is tapered as indicated at 135 and operates to engage a plunger 136 of a further limit switch LS–9 to close the switch upon the block attaining the above described predetermined closed position of the mold parts 40 and 44.

The overall operation of the simplified control circuit of FIG. 5–B may now be described. There is preferably provided at some convenient location a push button clamp CLOSE switch 140 and a clamp OPEN switch 142. The CLOSE switch 140 is preferably of the momentary "make" type and is connected in series with the normally closed switch 142. Electric power at line voltage may be temporarily applied to the control relay CR–6 by the CLOSE switch 140, when it is desired to close the mold parts for a cycle of injection. The relay CR–6 then becomes self-holding through its contacts 6–A in parallel with the switch 140.

Upon the closing of contact 6–A, the solenoid 5–B is operated to apply hydraulic fluid under reduced pressure to the line 106 and to the clamping cylinder 32. The clamping cylinder 32 and its attached bolster block begins to close the mold parts. When the bolster block 20 has reached a certain predetermined closed position, in which the mold parts 40 and 44 are substantially closed, the actuator 130 will operate to close the switch LS–9. This applies line voltage through closed relay contacts 6–B to the solenoids 11–A and 12–A. The solenoid 11–A applies full line pressure to the locking cylinders 70 and 72, thus bringing the cams 50 and 52 inwardly toward each other and into engagement with the bolster block 20. Simultaneously, the solenoid 12–A applies full line pressure to the clamping cylinder 32. A suitable indicator light 145 may be provided to show that the mold parts are closed.

The injection of the mold may then proceed in accordance with customary injection molding practice. Preferably, this portion of the cycle is timed out automatically. At the conclusion, the operator may then momentarily depress the OPEN switch 142 which breaks the holding circuit to relay CR–6. This breaks the power to the solenoids 11–A and 12–A and their respective valves 102 and 115 return to their initial position. The locking cylinders 70 and 72 are thus immediately retracted.

In the full retracted position of the cylinders 70 and 72 the limit switches LS–6 and LS–7 are closed by the pins 120, thus completing a circuit path through normally closed contact 6–C and a normally closed contact R–1 of a control relay R, not shown, to solenoid 9–A. The control relay R contact assures that the injection cycle has been completed. When solenoid 9–A is energized it shifts the solenoid of valve 102 to its initial position to effect the retracting or opening movement of the cylinder 32, thus completing the cycle of operation.

It will therefore be seen that this invention has provided a self-adjusting and self-aligning clamp for injection molding machines. The mechanism operates to close the mold parts along the parting plane 46 over a wide range of variations in height of the mold parts and in parallelism between the parts. The opposed locking cams 50 and 52, which move independently of each other, under an influence of common supply of hydraulic fluid under pressure, force the bolster block 20 into the closed position with a uniform force. The control circuit applies the high closing force only after proper alignment of the mold parts is assured. Additional closing force is provided by the clamping cylinder 32 by the application of high fluid pressure to the cylinder simultaneously with the operation of the locking cylinders 70 and 72.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a plastic injection machine in which a first mold part cooperates with a succession of movable cooperating selectable mold parts fixedly mounted on a movable table, an improved clamping mechanism for closing said first mold part with each of said selectable mold parts over a range of variations in height and parallelism of said selectable mold parts with respect to said first mold part, comprising means forming guideways, a mold-supporting head mounted for opening and closing movement on said guideways, means defining clearance between said head and said guideways providing limited, self-aligning movement of said head with respect to said guideways in a plane transverse to the direction of the opening and closing movement of said head in said guideways, means on said head supporting said first mold part for movement therewith between an open retracted position and a closed position in which said first mold part is in closing engagement with a selected one of said cooperating mold parts, a first cylinder connected to move said head between said open and said closed positions, a pair of generally oppositely positioned locking cam members mounted for transverse reciprocal movement with respect to said guideways between retracted positions clear of said head and inward positions in engagement with said head, means on said head and said locking cam members defining mutually cooperating cam surfaces extending generally the width of said members and effective upon transverse inward movement of said cam members into engagement with said head to force said head and the said first mold part into closing engagement with each selected one of said selectable mold parts over variations in height and parallelism of said selectable mold parts with respect to said first mold part by limited transverse movement of said head in said guideways, and a cam member operating cylinder for each of said cam members connected to move said cam members between said restricted and said inward positions.

2. The injection machine of claim 1 further comprising means connected to apply fluid under relatively low pressure to said first cylinder for moving said first mold part to a substantially closed position with one of said selectable mold parts under relatively low force, means responsive to said block attaining a predetermined moved position toward said selectable mold part and operable to apply fluid under relatively high pressure to said first piston motor upon attaining said predetermined position, and further means responsive to said position responsive means for applying fluid simultaneously to said cam member operating cylinders.

3. The machine of claim 1 in which said mutually cooperating locking cam and head surfaces are formed with a slope approximately 10° from a reference plane normal to the direction of movement of said head in said guideway.

4. The machine of claim 1 in which said guideways are each formed with means defining an opening therethrough, with said cam members being received in said guideways for reciprocating guided movement in said openings.

References Cited by the Examiner
UNITED STATES PATENTS

| | | | |
|---|---|---|---|
| 2,111,857 | 3/1938 | Jeffery | 18—30 |
| 2,115,590 | 4/1938 | Ryder | 18—30 |
| 2,618,823 | 11/1952 | Perkon | 18—30 X |
| 3,195,186 | 7/1965 | Gauban et al. | 18—43 |

J. SPENCER OVERHOLSER, *Primary Examiner.*

W. L. McBAY, *Assistant Examiner.*